(12) United States Patent
Seelig

(10) Patent No.: US 9,472,866 B1
(45) Date of Patent: Oct. 18, 2016

(54) GROUNDING CLIP HAVING A PLANAR CENTRAL PANEL WITH TWO LEGS EACH WITH A FLANGE

(71) Applicant: Mounting Systems GmbH, Rangsdorf (DE)

(72) Inventor: Jan Seelig, Ahrensfelde (DE)

(73) Assignee: MOUNTING SYSTEMS GMBH, Rangsdorf (DE)

( * ) Notice: Subject to any disclaimer, the term of this patent is extended or adjusted under 35 U.S.C. 154(b) by 0 days.

(21) Appl. No.: 14/963,474

(22) Filed: Dec. 9, 2015

(51) Int. Cl.
  *H01R 13/648* (2006.01)
  *H01R 4/44* (2006.01)
  *H01R 4/26* (2006.01)
  *H01R 13/658* (2011.01)

(52) U.S. Cl.
  CPC ........ *H01R 4/44* (2013.01); *H01R 4/26* (2013.01); *H01R 13/65802* (2013.01)

(58) Field of Classification Search
  CPC ................. H01R 13/648; H01R 13/65802
  USPC .......................................... 439/95, 98, 108
  See application file for complete search history.

(56) References Cited

U.S. PATENT DOCUMENTS

| | | | | |
|---|---|---|---|---|
| 4,029,384 A * | 6/1977 | Reinwall, Jr. | ......... | H01R 4/245 439/397 |
| 5,636,306 A * | 6/1997 | Mock | ................... | G02B 6/4416 385/100 |
| 6,024,586 A * | 2/2000 | Kumagai | ........... | H01R 23/6873 411/163 |
| 6,164,986 A * | 12/2000 | Frantz | .............. | H01R 13/65802 439/98 |
| 6,287,147 B1 * | 9/2001 | Lin | ..................... | H01R 23/6873 439/607.27 |
| 6,685,488 B2 * | 2/2004 | Billman | ............... | H01R 13/514 439/108 |
| 6,986,673 B2 * | 1/2006 | de la Borbolla | ......... | H01R 4/66 439/100 |
| 8,092,129 B2 | 1/2012 | Wiley et al. | | |
| 8,590,223 B2 * | 11/2013 | Kilgore | .................. | F24J 2/5256 136/244 |
| 8,894,424 B2 * | 11/2014 | DuPont | .................. | F24J 2/4607 439/95 |

* cited by examiner

*Primary Examiner* — Chandrika Prasad
(74) *Attorney, Agent, or Firm* — Ware, Fressola, Maguire & Barber LLP

(57) ABSTRACT

The invention refers to a grounding clip for use with electrically conducting frame profiles. The grounding clip being a cut-out and bended piece of metal exhibiting a planar central panel having two longitudinal edges that are essentially parallel to each other, a clearance hole that is configured to receive a fastener and that is arranged in the central panel, protrusions extending from the central panel into the clearance hole, two legs, each leg extending from the central panel along one of the longitudinal edges, and two planar flanges, each flange extending from a respective one of the two legs and extending in parallel to the central panel. The two flanges each comprise two lengthwise ends, wherein each lengthwise end is provided with at least one tooth extending at a tooth angle with respect to the respective flange and wherein the teeth on one side of the grounding clip extend in a different direction than the teeth on the other side of the grounding clip.

15 Claims, 3 Drawing Sheets

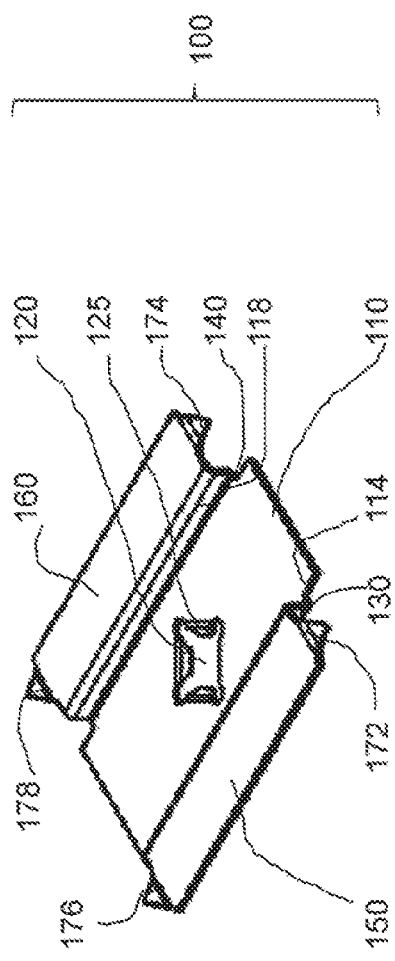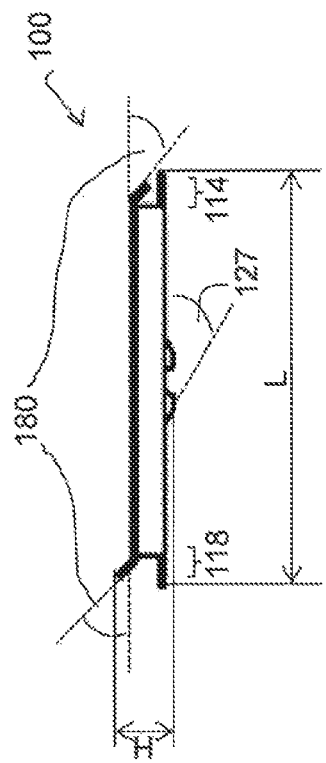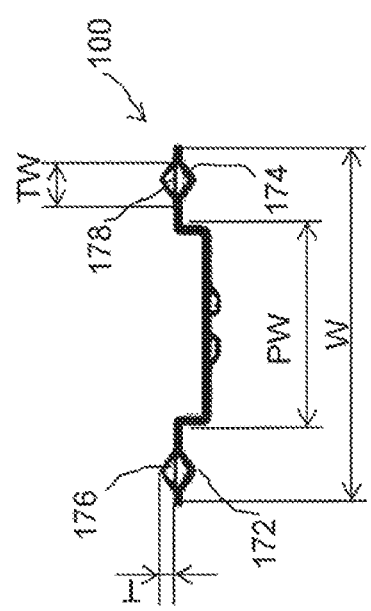

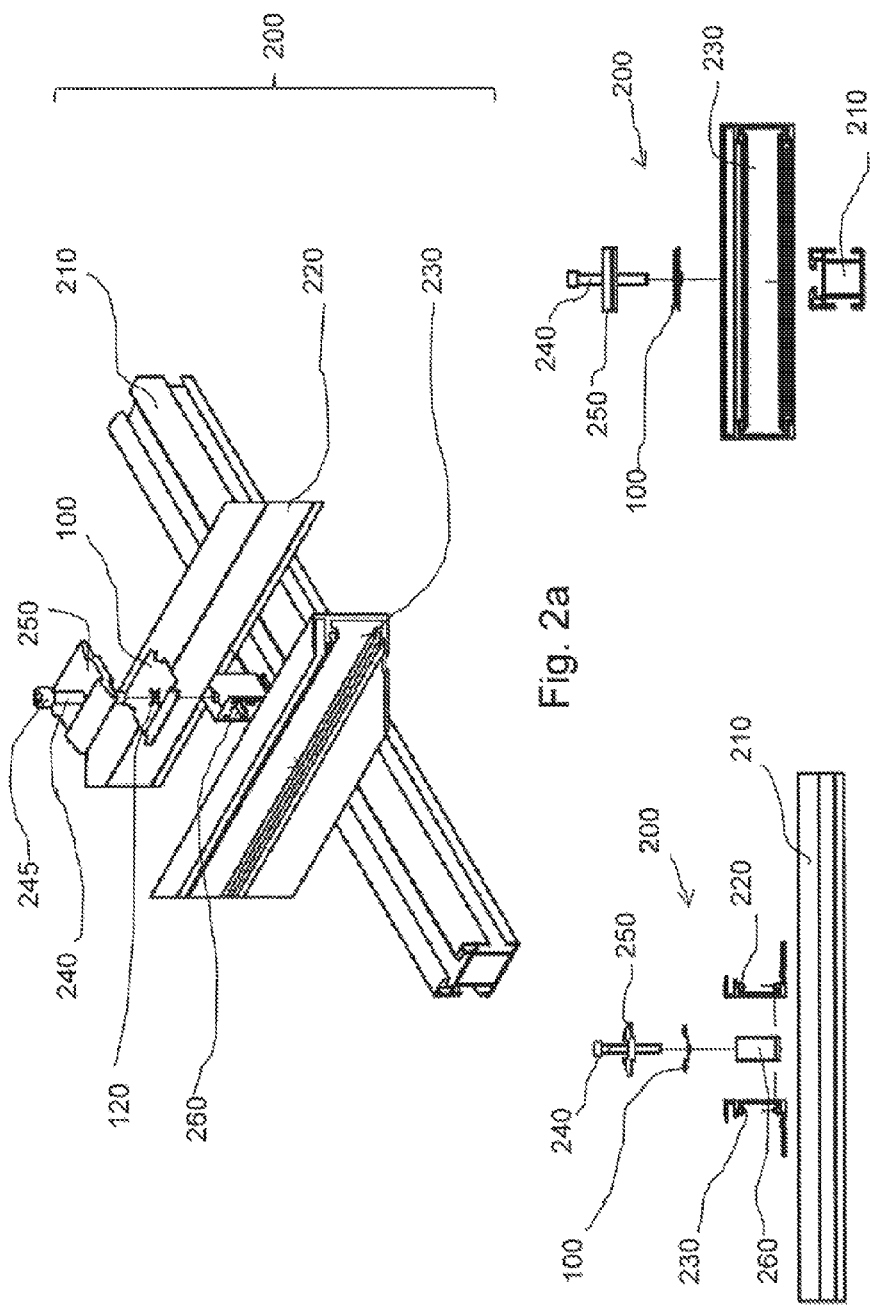

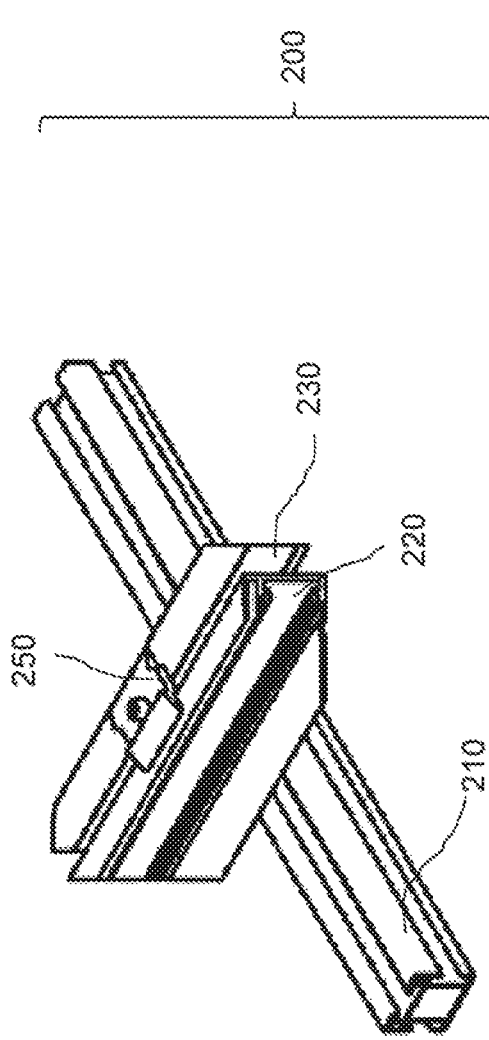
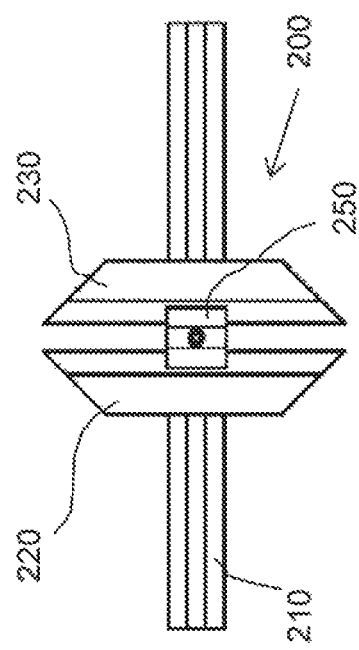
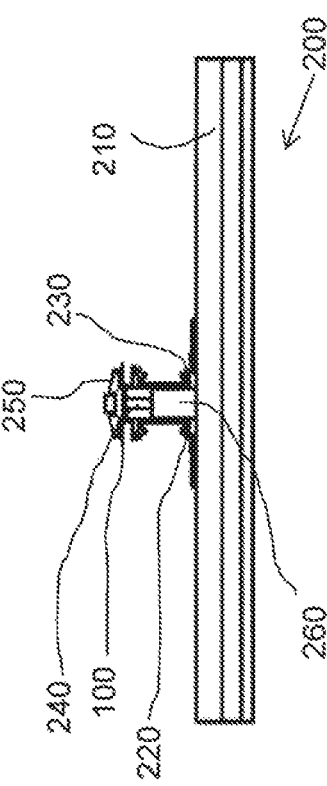
Fig. 3a
Fig. 3b
Fig. 3c

GROUNDING CLIP HAVING A PLANAR CENTRAL PANEL WITH TWO LEGS EACH WITH A FLANGE

TECHNICAL FIELD

The invention relates to a grounding clip for use with electrically conducting frame profiles and to a mounting arrangement for supporting framed solar modules.

BACKGROUND OF THE INVENTION

Photovoltaic arrays comprise a number of solar modules that are assembled onto a larger mounting arrangement. Such mounting arrangements usually comprise profile support rails which are attached to a basement and to frame profiles of the solar modules. These profile support rails and frame profiles are generally made of aluminium. To prevent corrosion and to interrupt a formation of an electrically conductive path between the solar modules and the basement, the aluminium of the frame profile usually exhibits a non-conductive outer surface. The non-conductive outer surface can be provided by anodizing the frame profiles, as in any source of electrical power, to ensure safety, the solar modules have to be electrically grounded.

A common practice in the industry is to install a separate grounding lug on each solar module. A more sophisticated device is described in the U.S. Pat. No. 8,092,129 B2, which relates to a bonding washer for making an electrical connection between two metal pieces that are to be mechanically fastened together. Teeth on the bonding washer, oriented at right angles to a plane of the bonding washer, are forced into each of the two metal pieces when a fastener is tightened, providing an electrical connection between the two metal pieces.

SUMMARY OF THE INVENTION

According to the present invention, a grounding clip for use with electrically conducting frame profiles is provided. The grounding clip comprises a bended piece of metal having:
 a planar central panel having two longitudinal edges that are essentially parallel to each other
 a clearance hole formed in the central panel that is configured to receive a fastener and that is arranged in said central panel
 protrusions extending from the central panel into the clearance hole
 two legs, each leg extending from said central panel along one of said longitudinal edges
 two planar flanges, each flange extending from a respective one of said two legs and extending in parallel to said central panel,
 said two flanges each having two lengthwise ends, wherein each lengthwise end is provided with at least one tooth extending at a tooth angle with respect to the respective flange and wherein the teeth on one side of said grounding clip protrude in a different direction than the teeth on the other side of the grounding clip.

The grounding clip is based on the recognition that the teeth on both sides of the grounding clip can penetrate non-conductive outer surface of the frame profiles and thus allow an electrical grounding of any source of electrical power that is mounted by the frame profiles, like solar modules which are fastened by the grounding clip. In view of the central panel with the two planar flanges, the grounding clip has the further advantage that it can serve as a spacer for two parts of a corresponding mounting arrangement, like the solar modules.

The protrusions that extend into the clearance hole of the grounding clip are formed and arranged to provide a fixation and an electrically conducting connection between fastener and grounding clip.

The two legs extending from the central panel provide two contact surfaces and a width of the central panel defines a space between these two contact surfaces for those two parts of the corresponding mounting arrangement which are fixed and electrically connected to each other by the grounding clip.

The grounding clip is a cut out and bended piece of metal. Accordingly, the teeth are cut into the piece of metal and bended in a way to form a tooth angle with respect to the respective flange. The tooth angle is adapted to extend the teeth on one side of the grounding clip in a different direction than the teeth on the other side of the grounding clip.

In the following, embodiments of the grounding clip will be described.

In an embodiment of the grounding clip, the two planar flanges are arranged on a same level. Thus, in this embodiment, the grounding clip fixes two parts of the corresponding mounting arrangement in a planar way. This is advantageous in case of a planar base of the mounting profile as it is often the case for a mounting of solar modules on the roof of a building.

In a further embodiment of the grounding clip, the two planar flanges have equal dimensions. In a variant of this embodiment, the grounding clip is formed symmetrically which can simplify the industrial production of these grounding clips and broaden possible fields of application in regard of a robust and elementary structure of the grounding clip.

In an embodiment of the grounding clip, the central panel has a larger length than the two extending legs and the two planar flanges, resulting in an expansion of the central panel at both sides of the grounding clip. In a variant, both expansions of the central panel exhibit a same length.

In an embodiment of the grounding clip, the central panel, the two legs and the two planar flanges each exhibit an essentially rectangular shape. Therefore, five rectangular portions were formed by bending the piece of metal in this embodiment.

The protrusions of the grounding clip may extend at a protrusion angle from the central panel into the clearance hole. This improves the stability of a metallic structure of the grounding clip with respect to deflection or breaking, while being fastened with the mounting profile. In a further embodiment, the grounding clip comprises at least one further clearance hole. Such a further clearance hole can be used to fasten large grounding clips or to fasten grounding clips which bear heavy loads.

In an embodiment of the grounding clip, the teeth on one side of the grounding clip protrude in a top direction from the plane of the respective flange and the teeth on the other side of the grounding clip protrude in the other direction from the plane of the respective flange. This is advantageous in view of the possibility to create an electrically conducting connection between the grounding clip and a part of the mounting profile arranged at a bottom side of the grounding clip and between the grounding clip and a part of the corresponding mounting arrangement arranged at a top side of the grounding clip. Therefore, the grounding clip according to this embodiment is arranged to provide an electrically conducting connection between a part of the mounting profile arranged at the other side of the grounding clip and a part of the corresponding mounting arrangement arranged at the top side of the grounding clip. In a variant of this embodiment, the teeth on the one side of the grounding clip protrude in exactly the opposite direction compared to the teeth on the other side of the grounding clip.

In an embodiment of the grounding clip, the teeth protrude at an acute-angled tooth angle from the respective flange. In a variant of this embodiment, the tooth angle is between 30° and 60°. In a further variant, the tooth angle is approximately 45°. Since an acute angled tooth angle enables the grounding clip to scratch over a respective part of the mounting profile during the fastening of the grounding clip, which means under a force transferred by the fastener, the resulting incorporated grounding clip exhibits a better electrical contact than in the case of teeth perpendicular to the respective flange. Therefore, the grounding clip of this embodiment can also reduce a selective stressing of a single spot of the mounting profile or of the module profile by allowing a bending of the teeth during the fastening of the grounding clip. This is particularly advantageous in view of a pressure sensitive glass layer of the solar module framed by the module profile.

In a preferred embodiment of the grounding clip, the number of teeth is four, which means that at both sides of both flanges one tooth is provided. In another embodiment, on each side of each flange two or more teeth are provided. In a further embodiment of the grounding clip, there are different numbers of teeth provided at both sides of the grounding clip.

In a preferred embodiment, the bended piece of metal is produced from a steel sheet or sheet metal.

In a further embodiment, the bended piece of metal exhibit a gauge between 0.4 mm and 1.0 mm. In a preferred variant, the gauge is essentially 0.5 mm.

In an embodiment, the grounding clip exhibit a total width between 25 mm and 40 mm, a total length between 20 mm and 60 mm or a total height between 2 mm and 8 mm, or a combination thereof. In a preferred variant of this embodiment, the grounding clip has a total width of 33.86 mm, a total length of 39.0 mm and a total height of 5.3 mm.

A further aspect of the invention refers to a mounting arrangement for supporting framed solar modules. The mounting arrangement comprises a profile support rail and two frame profiles arranged perpendicular to the profile support rail and fixed by a grounding clip according to one of the previously given embodiments, which is attached to the profile support rail by a fastener that is inserted through the clearance hole of the grounding clip while a clamp is arranged between the grounding clip and a head of the fastener, whereby the teeth of one side of the grounding clip are pushed into a respective surface of the frame profiles and the teeth of the other side of the grounding clip are pushed into the clamp forming an electrical connection between both frame profiles and the clamp.

The advantages of the mounting arrangement are the same as those of the grounding clip, since a use of the grounding clip can just be considered in the context of a corresponding mounting arrangement. In particular, the mounting arrangement allows an electrical grounding of any source of electrical power that is mounted by the mounting profile, like solar modules which are fastened by the grounding clip. The processes of pressing the teeth into a surface of the clamp and of the frame profiles, also comprises a bending of the teeth. The bending can further lead to a reduced selective stressing of a single spot the respective surface of the frame profile and of the module profile. Regarding the central panel with the two planar flanges, the mounting arrangement has the further advantage to be a spacer for the two frame profiles belonging to the solar modules.

In an embodiment of the mounting arrangement, the two frame profiles exhibit a non-conductive outer surface, which is penetrated by the teeth of one side of the grounding clip. In a variant of this embodiment, the non-conductive outer surface is an eloxal layer. In a further variant of this embodiment, the non-conductive outer surface is a powder coating.

In another embodiment of the mounting arrangement, the fastener is attached to a fixing device which in turn is attached to the profile support rail. In a variant of this embodiment, the fixing device comprises a profile which is adapted to a profile of the profile support rail. In a further variant of this embodiment, the fixing device can be clamped into the profile support rail. A clamping of the fixing device can advantageously simplify the assembling of the mounting arrangement.

In a preferred embodiment of the mounting arrangement, the fastener is a bolt. In another embodiment, the fastener is a screw. Thus, the head of the fastener is in the preferred embodiment a head of the bolt and in another embodiment a head of the screw.

The fastener has to provide a width in accordance with the diameter of the clearance hole and the protrusions of the grounding clip.

It shall be understood that the grounding clip according to claim 1 and the mounting arrangement of the further aspect of the invention, also defined in claim 12, have similar and/or identical embodiments.

These and other aspects of the invention will be apparent from and elucidated with reference to the embodiments described hereinafter.

BRIEF DESCRIPTION OF THE DRAWINGS

In the following drawings:

FIGS. 1a-1c show perspective illustrations of an embodiment of a grounding clip for a use with electrically conducting frame profiles whereby FIG. 1a shows an isometric projection, FIG. 1b a front view and FIG. 1c a left side view of the grounding clip;

FIGS. 2a-2c show perspective illustrations of an exploded view of an embodiment of a mounting arrangement for supporting framed solar modules according to a further aspect of the invention, whereby FIG. 2a shows an isometric projection, FIG. 2b a front view and FIG. 2c a left side view of the mounting arrangement;

FIGS. 3a-3c show perspective illustrations of the embodiment of the mounting arrangement according to FIGS. 2a-2c, whereby FIG. 3a shows an isometric projection, FIG. 3b a front view and FIG. 3c a top view of the mounting arrangement.

DETAILED DESCRIPTION

FIGS. 1a to 1c show perspective illustrations of an embodiment of a grounding clip 100 for a use with electrically conducting frame profiles. FIG. 1a shows an isometric projection, FIG. 1b a front view and FIG. 1c a left side view of the grounding clip 100.

The grounding clip 100 is a bended piece of metal which comprises a central panel 110 having two longitudinal edges 114, 118 that are essentially parallel to each other. The central panel 110 has a width PW which is between 15 mm and 20 mm, preferably 17.5 mm, and a length between 35 mm and 45 mm, preferably 39 mm.

The central panel 110 furthermore comprises a clearance hole 120 with protrusions 125 extending at a protrusion angle 127 from the central panel 110 into the clearance hole 120. The clearance hole 120 has a diameter between 8 mm and 9 mm, preferably a diameter of 8.6 mm, and the protrusion angle 127 from the central panel 110 leads to a depth of the corresponding protrusions 125 between 0.5 mm and 1.0 mm, preferably 0.8 mm, measured from the level of the central panel 110. The illustrated embodiment has a clearance hole 120 with a quadrangular shape. In further not illustrated embodiment, the shape of the clearance hole is triangular, pentagonal, hexagonal or octagonal. The clearance hole 120 is arranged at the centre of the central panel 110 with its edges oriented to the four sides of the central panel 110. In a not shown embodiment, four sides of the clearance hole 120 according to its quadrangular shape are oriented to the four sides of the central panel 110. The clearance hole 120 and the protrusions 125 are formed to provide a fastening of a fastener that has to be inserted into the clearance hole 120.

Two legs 130, 140 are provided. Each leg is arranged to perpendicularly extend from the central panel 110 along a major part of the longitudinal edges 114, 118. Both legs 130, 140 have equal dimensions and have a length between 30 mm and 40 mm, preferably 33 mm and a width between 2 mm and 4 mm, preferably 3.2 mm. Furthermore, there are two planar flanges 150, 160, each flange extending perpendicularly from a respective one of the two legs 130, 140 and extending on the same level in parallel to the central panel 110, while both planar flanges 150, 160 have equal dimensions and comprise the same length as the two legs 130, 140 and a width between 5 mm and 10 mm, preferably 8.18 mm.

The two flanges 150, 160 each have lengthwise ends, wherein each lengthwise end is provided with one tooth 172, 174, 176, 178, extending at a tooth angle 180 with respect to the respective flange 150, 160 and wherein the teeth 172, 174 on one side of the grounding clip 100 protrude in a bottom direction, which is the exactly opposed direction to the direction of the teeth 176, 178 on the other side of the grounding clip 100, which protrude in the other direction. As is also shown in FIG. 1c that the spike-shaped teeth 172, 174, 176, 178 protrude at an acute-angled tooth angle 180 which is between 30° and 60°, preferably 45°. Teeth 172, 174 on the front side of the grounding clip 100 are bended downwards into a bottom direction and the teeth 176, 178 on the back side of the grounding clip 100 are bended upwards into a top direction. Thereby the teeth 172, 174, 176, 178 exhibit a tooth-depth T between 0.5 mm and 2 mm, preferably 1.3 mm, measured from the level of the respective flange 150, 160 and show a maximal width TW between 4 mm and 5 mm, preferably 4.5 mm, at the edge of bending. The teeth 172, 174, 176, 178 are furthermore arranged at an outer portion of the respective flange 150, 160, i.e. a distance between a tooth and the leg 130, 140 of the respective flange 150, 160 that provides the tooth, is larger than a distance between this tooth and the outer edge of the respective flange 150, 160.

In the illustrated embodiment, the total length L of the grounding clip is between 20 mm and 60 mm, preferably 39 mm, the total width W of the grounding clip 100 is between 25 mm and 40 mm, preferably 33.86 mm, and the total height H of the grounding clip is between 2 mm and 8 mm, preferably 5.3 mm. The bended piece of metal comprises a gauge between 0.4 mm and 1.0 mm, preferably 0.5 mm, and is manufactured from a steel sheet. Thus, the width PW of the central panel 110 forms about half of the total width W of the grounding clip 100.

Furthermore, the central panel 110 extends beyond the two legs 130, 140 and the two planar flanges 150, 160. Thus, the central panel 110 has two symmetric expansions 114, 118, one on each side of the grounding clip 100. The symmetric expansions 114, 118 each have a respective length between 2 mm and 5 mm, preferably 3 mm. Thus, the symmetric expansions 114, 118 measure about one fifths of the total length PL of the central panel 110. The symmetric expansions 114, 118 have a width between 13 mm and 19 mm, preferably 15.4 mm. In view of its small cuts at all four edges of the central panel 110, the shape of central panel 110 is not perfectly rectangular. The small cuts in the depicted embodiment are essentially rectangular. In not shown embodiments, the small cuts are triangular or arc-shaped.

As illustrated in FIGS. 1a to 1c, the grounding clip 100 according to the depicted embodiment comprises the central panel 110, the two legs 130, 140 and the two flanges 150, 160 each exhibiting an essentially rectangular shape which has been formed by bending the piece of metal.

Respective relations between lengths and widths of parts of the grounding clip 100 to each other are chosen according to dimensions of the clamp, thus the grounding clip 100 is formed to be pressed against a clamp as shown in FIGS. 2a to 2c.

Another apparent feature of the depicted embodiment of the grounding clip 100 is its symmetric structure which simplifies an assembly with mounting profiles, since the orientation of the grounding clip 100 in combination with the mounting profile has no influence on its possible use.

In a not shown embodiment of the grounding clip, the number of teeth on each side of each flange is at least two. In a further not shown embodiment of the grounding clip, there are different numbers of teeth at both sides of the grounding clip FIGS. 2a to 2c show perspective illustrations of an exploded view of an embodiment of a mounting arrangement 200 for supporting framed solar modules according to a further aspect of the invention. FIG. 2a shows an isometric projection, FIG. 2b a front view and FIG. 2c a left side view of the mounting arrangement 200.

The figures show that the mounting arrangement 200 exhibits a profile support rail 210 and two frame profiles 220, 230 arranged perpendicular to the profile support rail 210 and fixed by a grounding clip 100 according to the embodiment shown in FIGS. 1a to 1c. The grounding clip 100 is attached to the profile support rail 210 by a fastener 240 that is inserted through the clearance hole 120 of the grounding clip 100 while a clamp 250 is arranged between the grounding clip 100 and a head 245 of the fastener 240. The fastener is furthermore attached to a fixing device 260 which in turn is attached to the profile support rail 210.

It is also illustrated by the exploded view of the mounting arrangement 200 that by fastening the grounding clip 100, the teeth 172, 174 of the front side of the grounding clip 100 are pushed into a respective surface of the frame profiles 220, 230 and the teeth 176, 178 of the other side of the grounding clip 100 are pushed into the clamp 250 forming an electrical connection between both frame profiles 220, 230 and the clamp 250.

The two frame profiles 220, 230, the profile support rail 210 and the clamp 250 in the depicted embodiment of the mounting arrangement 200 are coated by an eloxal layer. Since the acute angled tooth angle 180 enables the grounding clip 100 to scratch over a respective part of the coated frame profiles 220, 230 during the fastening of the grounding clip 100, which means under a force conveyed by the fastener 240. Therefore, in spite of the eloxal layer, the resulting incorporated grounding clip 100 exhibits an electrical contact to both frame profiles 220, 230 and to the clamp 250.

In a further not shown embodiment of the mounting arrangement 200, the frame profiles, the profile support rail 210 and the clamp 250 are coated by a powder coating.

According to the measures given in the context of FIGS. 1a to 1c, the fastener 240 has to provide a width in accordance with the diameter of the clearance hole and the protrusions of the grounding clip. Therefore, the fastener has a width between 7.7 mm and 8.7 mm in dependence on the respective width of the clearance hole.

The depicted fastener 240 is a bolt. In another not shown embodiment, the fastener is a screw.

FIGS. 3a to 3c show perspective illustrations of the embodiment of the mounting arrangement 200 as it is depicted in FIGS. 2a to 2c. FIG. 3a shows an isometric projection, FIG. 3b a front view and FIG. 3c a top view of the mounting arrangement 200.

In contrast to the exploded view shown in FIGS. 2a to 2c, an assembled state of the mounting arrangement 200 is shown. Therefore, the teeth 172, 174, 176, 178 are not visible in FIGS. 2a to 2c, since they are pressed to the respective surface of the frame profile 220, 230 and to the clamp 250. As a consequence of pressing the teeth 172, 174, 176, 178 into a surface, the teeth 172, 174, 176, 178 are bended. By allowing a bending, the grounding clip 100 can also reduce a selective stressing of a single spot of the frame profile 220, 230 and of the clamp 250. This is particularly advantageous in view of a typically pressure sensitive glass layer of the solar module framed by the frame profile 220, 230. The other parts of the mounting arrangement 200 are arranged as previously described in the context of FIGS. 2a to 2c. In particular, the frame profiles 220, 230 are arranged perpendicular to the profile support rail 210.

The fixing device 260 which is attached to the profile support rail 210, comprises a profile which is adapted to a profile of the profile support rail 210 and can therefore be clamped into the profile support rail 210. In a not shown embodiment, the fixing device 260 is attached to the profile support rail 210 by a further fastener, in particular by a bolt or by a screw.

As shown in FIGS. 3a to 3c, all surfaces of the respective parts of the mounting arrangement 200 fit perfectly together so that the resulting mounting arrangement is compact and robust. Thus, the grounding clip 100 is formed and respective lengths and widths of parts of the grounding clip 100 are chosen according to dimensions of the clamp.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In particular the presented grounding clip is not restricted to the use within solar module arrangements.

In the claims, the word "comprising" does not exclude other elements or steps, and the indefinite article "a" or an does not exclude a plurality.

A single step or other units may fulfil the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A grounding clip for use with electrically conducting frame profiles, said grounding clip comprising a bended piece of metal having:
   a planar central panel having two longitudinal edges that are essentially parallel to each other
   a clearance hole formed in the central panel that is configured to receive a fastener and that is arranged in said central panel
   protrusions extending from the central panel into the clearance hole
   two legs, each leg extending from said central panel along one of said longitudinal edges
   two planar flanges, each flange extending from a respective one of said two legs and extending in parallel to said central panel,
   said two flanges each having two lengthwise ends, wherein each lengthwise end is provided with at least one tooth extending at a tooth angle with respect to the respective flange and wherein the teeth on one side of said grounding clip protrude in a different direction than the teeth on the other side of the grounding clip.

2. The grounding clip according to claim 1, wherein said two planar flanges are arranged on a same level.

3. The grounding clip according to claim 1, wherein said two planar flanges have an equal size.

4. The grounding clip according to claim 1, wherein said protrusions extend at a protrusion angle from the central panel into the clearance hole.

5. The grounding clip according to claim 1, wherein the teeth on one side of said grounding clip protrude in a top direction of the respective flange and the teeth on the other side of the grounding clip protrude in the other direction of the respective flange.

6. The grounding clip according to claim 1, wherein said teeth extend at an acute-angled tooth angle from said respective flange.

7. The grounding clip according to claim 5, wherein said tooth angle is between 30° and 60°, preferably 45°.

8. The grounding clip according to claim 1, wherein the bended piece of metal comprises a gauge between 0.4 mm and 1.0 mm.

9. The grounding clip according to claim 1, wherein the grounding clip comprises a total width between 25 mm and 40 mm, a total length between 20 mm and 60 mm or a total height between 2 mm and 8 mm, or a combination thereof.

10. The grounding clip according to claim 1, wherein said two planar flanges, said two legs and the central panel each comprise an essentially rectangular shape.

11. The grounding clip according to claim 1, wherein the bended piece of metal is manufactured from a steel sheet.

12. A mounting arrangement for supporting framed solar modules, exhibiting:
    a profile support rail
    two frame profiles arranged perpendicular to the profile support rail and fixed by a grounding clip according to claim 1, which is attached to the profile support rail by a fastener that is inserted through said clearance hole of the grounding clip while a clamp is arranged between the grounding clip and a head of the fastener, whereby the teeth of one side of said grounding clip are pushed into a respective surface of the frame profiles and the teeth of the other side of the grounding clip are pushed into the clamp forming an electrical connection between both frame profiles and the clamp.

13. The mounting arrangement according to claim 12, wherein the two frame profiles exhibit a non-conductive outer surface, which is penetrated by the teeth of one side of said grounding clip.

14. The mounting arrangement according to claim 13, wherein the non-conductive outer surface is an eloxal layer.

15. The mounting arrangement according to claim 12, wherein the fastener is attached to a fixing device which in turn is attached to the profile support rail.

\* \* \* \* \*